US010852392B2

(12) United States Patent
Park

(10) Patent No.: US 10,852,392 B2
(45) Date of Patent: Dec. 1, 2020

(54) SELF-CALIBRATION DEVICE AND SELF-CALIBRATION METHOD FOR VEHICLE RADAR

(71) Applicant: LG INNOTEK CO., LTD., Seoul (KR)

(72) Inventor: Dong Chan Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 230 days.

(21) Appl. No.: 15/742,349

(22) PCT Filed: Jul. 8, 2016

(86) PCT No.: PCT/KR2016/007417
§ 371 (c)(1),
(2) Date: Jan. 5, 2018

(87) PCT Pub. No.: WO2017/007274
PCT Pub. Date: Jan. 12, 2017

(65) Prior Publication Data
US 2018/0203097 A1 Jul. 19, 2018

(30) Foreign Application Priority Data
Jul. 8, 2015 (KR) .................. 10-2015-0096953

(51) Int. Cl.
G01S 7/40 (2006.01)
G01S 13/931 (2020.01)
(52) U.S. Cl.
CPC .......... G01S 7/4021 (2013.01); G01S 7/4026 (2013.01); G01S 13/931 (2013.01); G01S 2007/4082 (2013.01); G01S 2013/93271 (2020.01)
(58) Field of Classification Search
CPC ............ G01S 7/4021; G01S 13/931; G01S 2013/9375; G01S 7/40; G01S 7/4008;
(Continued)

(56) References Cited

U.S. PATENT DOCUMENTS 5,581,517 A * 12/1996 Gee ..................... G01S 7/52046
367/11
6,029,116 A * 2/2000 Wright ................. G01S 7/52023
702/32
(Continued)

FOREIGN PATENT DOCUMENTS

JP 2010-066092 A 3/2010
KR 10-2009-0065187 A 6/2009
(Continued)

OTHER PUBLICATIONS

Wulf-Dieter Wirth (Radar Techniques Using Array Antennas Chapter 5: Beamforming). Copyright The Institution of Electrical Engineers 2001. The relevant page has been provided for in the Office Action in the Conclusion section. (Year: 2001).*

(Continued)

Primary Examiner — Erin F Heard
Assistant Examiner — Michael W Justice
(74) Attorney, Agent, or Firm — Birch, Stewart, Kolasch & Birch, LLP

(57) ABSTRACT

A self-calibration device for a vehicle radar, according to one embodiment of the present invention, comprises: a transmission part for outputting a transmission signal to a reflection plate disposed at the front of a vehicle; and a reception part for receiving a reception signal reflected by the reflection plate, wherein the reception part comprises: a phase correction part for correcting a phase of the reception signal; and an angle calculation part for setting the corrected phase as a reference value.

12 Claims, 16 Drawing Sheets (a)

(b)

(58) Field of Classification Search
CPC .............. G01S 7/4026; G01S 7/4034; G01S 13/93271; G01S 2007/4086; G01S 2007/4034
USPC ....................................................... 342/174
See application file for complete search history.

(56) References Cited

U.S. PATENT DOCUMENTS

| | | | | |
|---|---|---|---|---|
| 6,636,172 | B1* | 10/2003 | Prestl | G01S 7/4026 342/173 |
| 7,498,971 | B2* | 3/2009 | Takagi | G01S 7/4004 342/70 |
| 9,923,269 | B1* | 3/2018 | Hageman | H01Q 3/267 |
| 2008/0224916 | A1* | 9/2008 | Takagi | G01S 7/4004 342/91 |
| 2010/0118140 | A1* | 5/2010 | Iwakiri | B62D 15/028 348/135 |
| 2011/0153268 | A1* | 6/2011 | Jordan | G01S 13/931 702/151 |
| 2011/0285571 | A1* | 11/2011 | Jeong | H01Q 1/3233 342/27 |
| 2013/0113653 | A1* | 5/2013 | Kishigami | G01S 7/285 342/189 |
| 2015/0035697 | A1 | 2/2015 | Cho | |

FOREIGN PATENT DOCUMENTS

| | | |
|---|---|---|
| KR | 10-2014-0124145 A | 10/2014 |
| KR | 10-2015-0015067 A | 2/2015 |
| KR | 10-2015-0034349 A | 4/2015 |

OTHER PUBLICATIONS

Ma (Ultrasond phase rotation beamforming on multi-core DSP) Ultrasonics 54 (2014) 99-105. (Year: 2014).*

International Search Report for PCT/KR2016/007417 (PCT/ISA/210) dated Oct. 21, 2016.

* cited by examiner

1000

100

FIG. 3
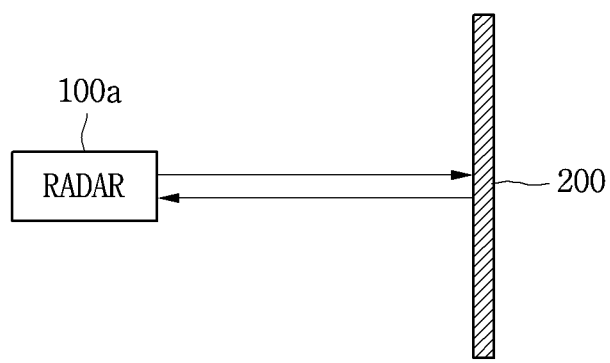
(a)
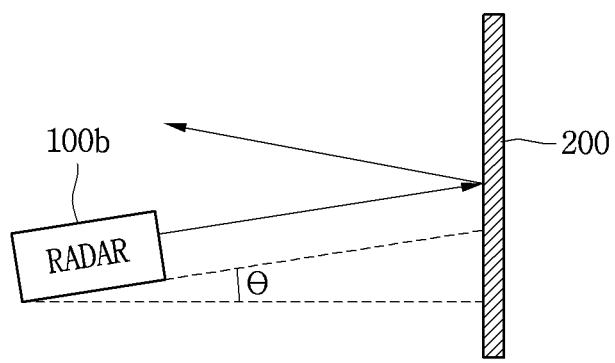
(b)

SELF-CALIBRATION DEVICE AND SELF-CALIBRATION METHOD FOR VEHICLE RADAR

CROSS REFERENCE TO RELATED APPLICATIONS

This application is the National Phase of PCT International Application No. PCT/KR2016/007417, filed on Jul. 8, 2016, which claims priority under 35 U.S.C. 119(a) to Patent Application No. 10-2015-0096953, filed in the Republic of Korea on Jul. 8, 2015, all of which are hereby expressly incorporated by reference into the present application.

TECHNICAL FIELD

Embodiments relate to a self-calibration device and a self-calibration method for a vehicle radar, and more particularly to a device for correcting an angular error when a radar installed in a vehicle is misaligned.

BACKGROUND ART

There have been increased vehicles, each of which is equipped on a front thereof with a radar to measure the distance from a forward vehicle in the vehicle travelling direction to keep the distance from the forward vehicle constant or recognize an obstacle ahead thereof to cope with the obstacle.

In the case of a radar installed in a vehicle, the radar may be misaligned due to an impact applied thereto during travelling, and the misalignment may cause an error in measuring the distances from the forward vehicle and obstacle so that a fatal accident may occur during travelling.

Accordingly, there is a need to provide a device for correcting an angular error of a vehicle radar.

DISCLOSURE

Technical Problem

An object of the present disclosure is to provide a self-calibration device and a self-calibration method for a vehicle radar, which can correct an angular error of a radar.

Technical Solution

According to one embodiment, there is provided a self-calibration device for a vehicle radar, which includes: a transmission part for outputting a transmission signal to a reflection plate disposed at the front of the vehicle; and a reception part for receiving a reception signal reflected by the reflection plate, wherein the reception part includes a phase correction part for correcting a phase of the reception signal; and an angle calculation part for setting the corrected phase as a reference value.

According to another embodiment, there is provided a self-calibration device for a vehicle radar, which includes: a transmission part for outputting a transmission signal to a reflection plate disposed at a front of the vehicle; and a reception part for receiving a reception signal reflected by the reflection plate, wherein the reception part includes a plurality of receivers; and wherein the reception part includes a phase comparison part for comparing phases of reception signals of the receivers; and an IQ modulation part for correcting the phase of the reception signal by controlling an offset according to a comparison result.

According to a still another embodiment, there is provided a self-calibration method for a vehicle radar, which includes: outputting a signal toward a reflection plate by a radar installed at a front of a vehicle; reflecting the signal by the reflection plate; comparing phases of first and second receivers of the radar with each other; and correcting the phase of the second receiver when the phases of the first and second receivers are different from each other.

According to a still another embodiment, there is provided a self-calibration method for a vehicle radar, which includes: outputting a signal toward a reflection plate by a radar installed at a front of a vehicle; reflecting the signal by the reflection plate; comparing phases of first and second receivers of the radar with each other; and correcting a second IQ modulator when the phases of the first and second receivers are different from each other.

Advantageous Effects

Since the self-calibration device and the self-calibration method for a vehicle radar correction method have the self-calibration function capable of correcting the angular error of the radar for the vehicle, the reliability may be improved, thereby allowing the vehicle to operate safely.

DESCRIPTION OF DRAWINGS

FIG. 3 is a view illustrating an angular error of a radar according to an embodiment of the present disclosure.

BEST MODE

[Mode of the Invention]

Figure 1:
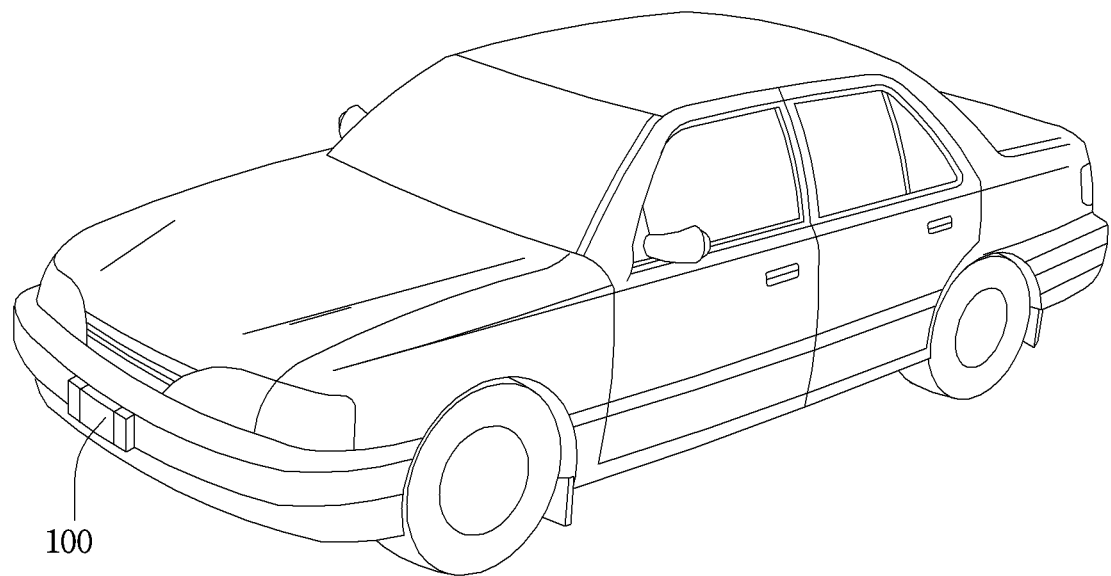
FIG. 1 is a perspective view illustrating a vehicle on which a radar is mounted according to an embodiment of the present disclosure.

Hereinafter, an embodiment disclosed in the present specification will be described in detail with reference to the accompanying drawings, and, regardless of the reference numerals, the same or corresponding configuration elements will be assigned with the same reference numeral and overlapping description of the same will be omitted for simplicity. The suffixes "module" and "unit (or part)" that are mentioned in the elements used in the following description are merely used individually or in combination for the purpose of simplifying the description of the present invention. Therefore, the suffix itself will not be used to give a significance or function that differentiates the corresponding terms from one another. In addition, the detailed description of well-known features or functions will be ruled out in order not to unnecessarily obscure the gist of the embodiment disclosed in the present specification. In addition, the features of the embodiment disclosed in the present specification will be more clearly understood from the accompanying drawings and should not be limited by the accompanying drawings. It is to be appreciated that the spirit and technical scope of the present disclosure can encompass all changes, equivalents, and substitutes in addition to the attached drawings.

While terms including ordinal numbers, such as "first" and "second," etc., may be used to describe various components, such components are not limited by the above terms. The above terms are used only to distinguish one component from another.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms of a singular form may include plural forms unless otherwise specified.

In the present disclosure, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term 'vehicle' used in the present disclosure may cover a car and a motorbike in concept. The following description is given with the appreciation that a vehicle is a car, by way of example.

In the present disclosure, a vehicle may be any of a vehicle equipped with an engine as a power source, a hybrid vehicle equipped with an engine and an electrical motor as power sources, an electric vehicle equipped with an electrical motor as a power source, and so on.

In the following description, the left of a vehicle refers to a left side based on a driving direction of the vehicle, and the right of the vehicle refers to a right side based on the driving direction of the vehicle.

Unless otherwise mentioned, the following description is focused on a left hand drive (LHD) vehicle.

FIG. 1 is a perspective view illustrating a vehicle on which a radar is mounted according to an embodiment of the present disclosure.

Referring to FIG. 1, a vehicle 1000 equipped with a radar according to an embodiment may include a self-calibration device 100 for a vehicle radar installed at the front of the vehicle 1000. According to an embodiment, the self-calibration device 100 for a vehicle radar may be disposed on an upper surface or both side surfaces of the vehicle 1000, but the embodiment is not limited thereto.

The self-calibration device 100 for a vehicle radar may transmit a signal to a reflection plate disposed ahead thereof, measure a received signal returning thereto to determine whether misalignment occurs, and perform a self-correction.

Figure 2:
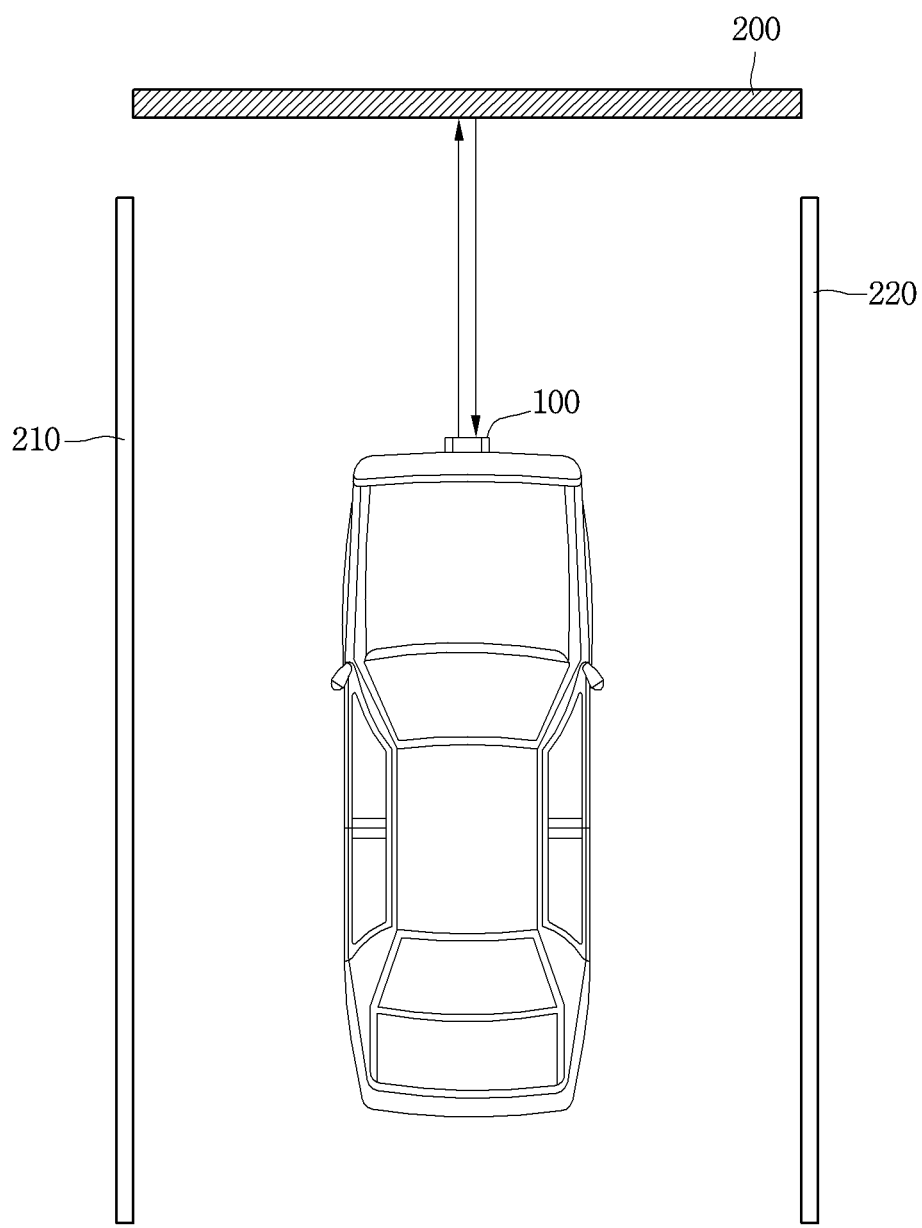
FIG. 2 is a plan view illustrating a radar correction using a reflection plate according to an embodiment of the present disclosure.

FIG. 2 is a plan view illustrating a radar correction using a reflection plate according to an embodiment of the present disclosure.

Referring to FIG. 2, the vehicle 1000 may move along parking lines 210 and 220 to be arranged to face the reflection plate 200 and align vertically with the reflection plate 200 to perform the self-correction. According to the present embodiment, the vehicle radar may correct the angle thereof by itself without place at the place where the reflection plate 200 is installed in front so that the vehicle 1000 may easily perform the correction.

According to an embodiment, the reflection plate 200 may include a corner reflector. The corner reflector, which is a three-sided structure in which all the electromagnetic waves incident into an effective aperture are reflected back to the incident direction itself regardless of the incident angle, may have a shape which has three surfaces orthogonal to each other and corresponds to one corner of the cube.

FIG. 3 is a view illustrating an angular error of a radar according to an embodiment of the present disclosure.

FIG. 3A illustrates a case where the self-calibration device 100a for a vehicle radar is disposed in perpendicular to the reflection plate 200 to be mounted appropriately. FIG. 3B illustrates a case where the self-calibration device 100b for a vehicle radar is misaligned by an angle (θ). According to an embodiment, as shown FIG. 3B, when the self-calibration device 100b for a vehicle radar is misaligned due to an external impact, the angles of a plurality of receivers may be corrected such that the angle (θ) is output by setting the angle (θ) as reference value 0°.

Figure 4:
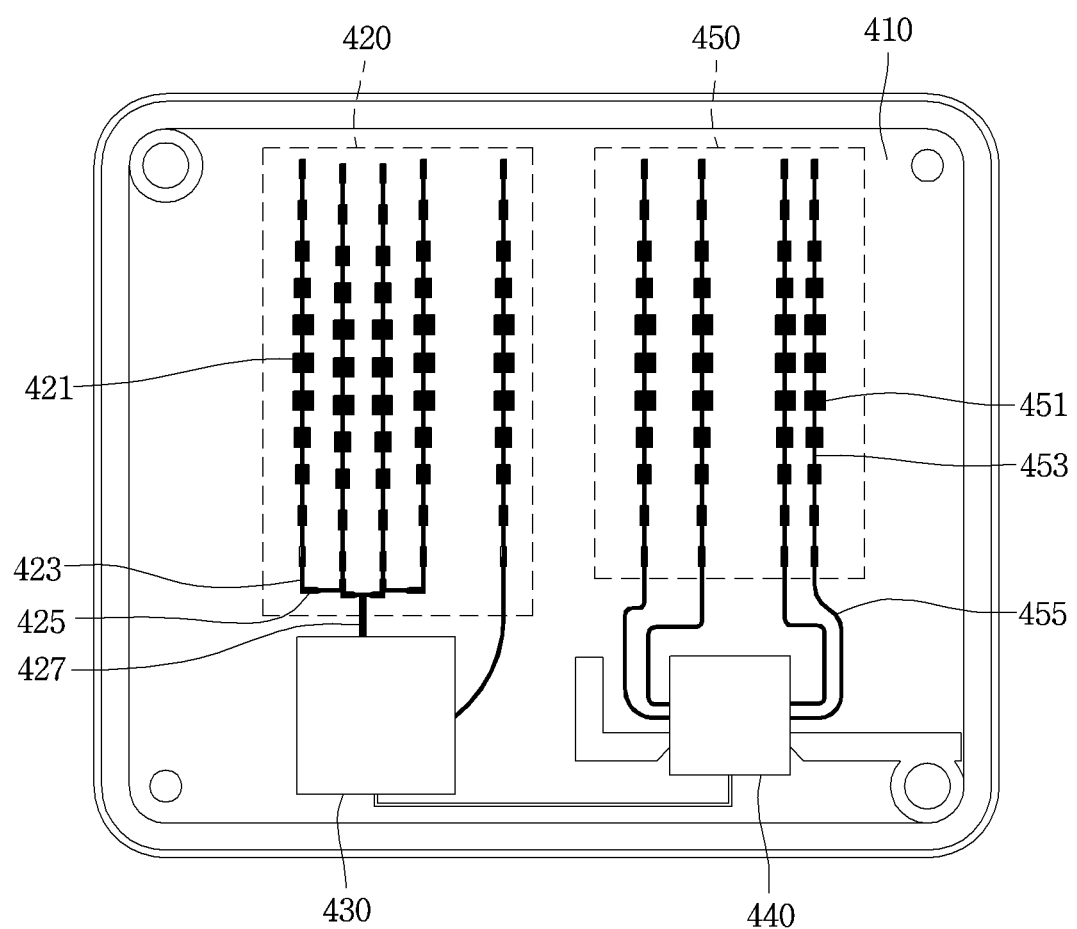
FIG. 4 is a plan view illustrating a printed circuit board of a radar according to an embodiment of the present disclosure.

FIG. 4 is a plan view illustrating a printed circuit board of a radar according to an embodiment of the present disclosure.

Referring to FIG. 4, the self-calibration device 100 for a vehicle radar may include a radar module 400. The radar module 400 may include a transmission antenna part 420, a transmission processing part 430, a reception antenna part 450 and a reception processing part 440 disposed on a printed circuit board 410.

The radar module 400 performs a function of detecting an operation of an object in a surrounding area of a current position. The radar module 400 detects information about the surrounding environment through electromagnetic waves. In this case, the radar module 400 may detect an appearance, movement, etc. of an object caused by the operation of the object.

The transmission antenna part 420 and the reception antenna part 450 perform a wireless transmission/reception function of the radar module 400. In this case, the transmission antenna part 420 transmits a transmission signal into the air and the reception antenna part 450 receives a reception signal through the air, where the transmission signal represents a wireless signal transmitted from the radar module 400 and the reception signal represents a wireless signal input to the radar module 400 as the transmission signal is reflected by the reflection plate 200.

The transmission antenna part 420 may include a radiator 421, a feeding line 423, a distribution part 425 and a feeding point 427.

The radiator 421 emits a signal at the transmission antenna part 420. That is, the radiator 421 constitutes a radiation pattern of the transmission antenna part 420. In this case, the radiator 421 is arranged along the feeding line 423. The radiator 421 is formed of a conductive material. The radiator 421 may include at least one of Ag, Pd, Pt, Cu, Au and Ni.

In this case, weights are individually set in advance in the radiators 421. That is, a unique weight is set to each radiator 421. In this case, the weight includes a resonant frequency, a radiation coefficient, a beam width, and values for impedance matching and obtaining a detection distance of the transmission antenna 420. The weight may be calculated based on a Taylor function or a Chebyshev function.

In addition, the weights are set differently depending on the positions of the radiators 421. Each radiator 421 is formed with a parameter determined according to each weight. In this case, the size and shape of the radiator 421 may be determined by the parameter for the radiator 421.

The feeding lines 423 substantially provide a signal to the radiators 421. In this case, the feeding lines 423 extend in one direction. In addition, the feeding lines 423 are arranged side by side in the opposite direction. In this case, the feeding lines 423 are spaced apart from one another by a predetermined interval. A signal is transmitted from one end to the other end of each feeding line 423.

The distribution part 425 supplies a signal from the feeding point 427 to the feed lines 423. In this case, the distribution part 425 distributes the signals to the feeding lines 423. In addition, the distribution part 425 extends from the feeding point 427. The distribution part 425 is connected to each feeding line 423. The distribution part 425 includes a plurality of feeding ports. In this case, each feed port is connected to each feeding line 423. The feeding ports may be arranged side by side in one direction. In addition, the feeding ports are sequentially connected from the feeding point 427.

The transmission processing part 430 and the reception processing part 440 perform a radio processing function of the radar module 400. In this case, the transmission processing part 430 processes the transmission signal, and the reception processing part 440 processes the reception signal.

The transmission processing part 430 generates a transmission signal from the transmission data. The transmission processing part 430 outputs the transmission signal to the transmission antenna part 420. In this case, the transmission processing part 430 may include an oscillation part 520 (in FIG. 5). For example, the oscillation part may include a voltage controlled oscillator (VCO) and an oscillator.

The reception antenna part 450 may include a radiator 451, a feeding line 453 and a feeding point 455.

The radiators 451 emit signals at the reception antenna part 450. That is, the radiators 421 constitute a radiation pattern of the reception antenna part 450. In this case, the radiators 451 are arranged along the feeding line 453. The radiators 451 are formed of a conductive material. The radiators 451 may include at least one of Ag, Pd, Pt, Cu, Au and Ni.

In this case, weights are individually set in advance in the radiators 451. That is, a unique weight is set to each radiator 451. In this case, the weight includes a resonant frequency, a radiation coefficient, a beam width, and values for impedance matching and obtaining a detection distance of the transmission antenna 420. The weight may be calculated based on a Taylor function or a Chebyshev function.

In addition, the weights are set differently depending on the positions of the radiators 451. The feeding lines 453 substantially provide a signal to the radiators 421. In this case, the feeding lines 453 extend from the feeding point 455. In addition, the feeding lines 453 extend in one direction. In this case, a signal is transmitted from one end to the other end of the feeding line 453.

The reception processing part 440 receives the reception signal from the reception antenna part 450. The reception processing part 440 generates reception data from the reception signal. In this case, the reception processing part 440 includes an amplifier 540 in FIG. 5 and an analog-to-digital converter (ADC) 550 in FIG. 5. The amplifier low-noise amplifies the received signal. The ADC converts the analog reception signal to digital data to generate the reception data.

Figure 5:
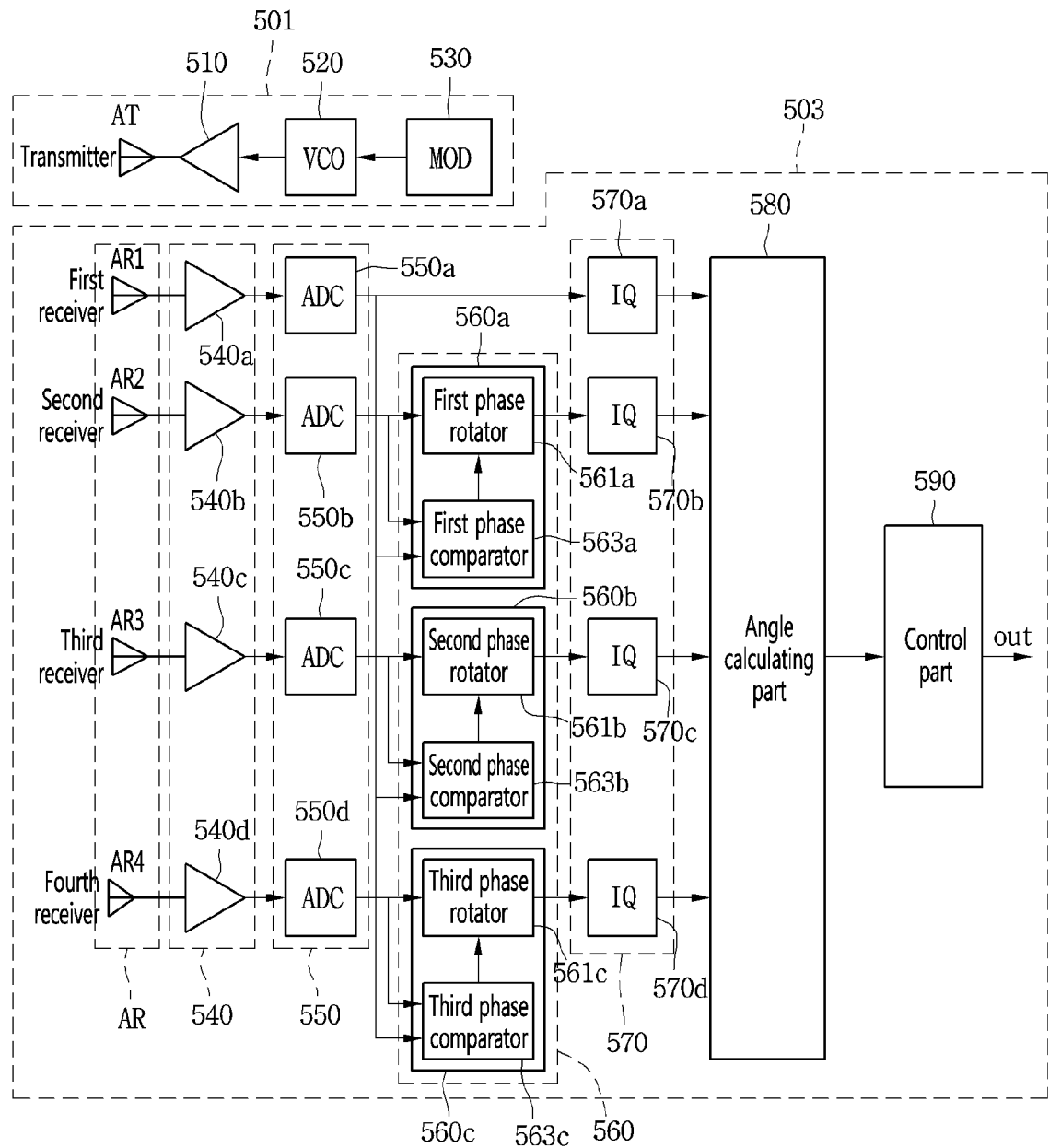
FIG. 5 is a block diagram illustrating a transmission part and a reception part of a radar according to an embodiment of the present disclosure.

FIG. 5 is a block diagram illustrating a transmission part and a reception part of a radar according to an embodiment of the present disclosure.

Referring to FIG. 5, the self-calibration device 100 for a vehicle radar may include a transmission part 501 and a reception part 503. The transmission part 501 may include a transmission antenna AT, an amplifier 510, a voltage-controlled oscillator 520, and a modulation signal generator 530.

The transmission antenna AT transmits the transmission signal into the air. In this case, the transmission antenna AT may have a single transmission channel. The transmit antenna AT nay transmit a transmission signal through a single transmission channel. The transmission antenna AT includes a feeding part and a plurality of radiators.

The feeding part provides signals to the radiators. The feeding part is formed of a conductive material. In this case, the feeding part may include at least one of Ag, Pd, Pt, Cu, Au and Ni.

The radiators emit a signal at the transmission antenna AT. That is, the radiators constitute a radiation pattern of the transmission antenna part. In this case, the radiators are dispersedly arranged in the feeding part. The radiators are arranged along the feeding lines. Thus, a signal is supplied from the feeding part to the radiators. The radiators are formed of a conductive material. In this case, the radiators may include at least one of Ag, Pd, Pt, Cu, Au and Ni.

The reception part 503 may include an antenna part AR, an amplifying part 540, an analog-digital converting part 550, a phase correcting part 560, an IQ modulating part 570, an angle calculating part 580, and a control part 590.

In an embodiment, the reception antenna part AR, the amplifying part 540, the analog-to-digital converting part 550, the phase correcting part 560, and the IQ modulating part 570 may be configured with a plurality of components, but the embodiment is not limited thereto.

The antenna part AR may include a plurality of antennas and may receive a reception signal through the air. The antenna part AR may include a feeding part for supplying a signal to a plurality of radiators and the radiators for emitting signals. The feeding part is formed of a conductive material. The feeding part may include at least one of Ag, Pd, Pt, Cu, Au and Ni.

The radiator emits a signal at the antenna part AR. That is, the radiators constitute a radiation pattern of the reception antenna. In this case, the radiators are dispersedly arranged in the feeding part. The radiators are arranged along the feeding line. Thus, a signal is supplied from the feeding part to the radiator. The radiator is formed of a conductive material. The radiator may include at least one of Ag, Pd, Pt, Cu, Au and Ni.

The IQ modulating part 570 may fine adjust the phase of the reception signal by adjusting the offset. The angle calculating part 580 may set the signal output from the IQ modulating part 570 as a reference value and output the signal to the control part 590. The reference value may be set to 0°.

The control part 590 may control the operation of the phase correcting part 560 and output the signal received from the angel calculating part 580.

A first receiver may include a first reception antenna AR1, a first amplifier 540*a*, a first analog-digital converter 550*a*, a first IQ modulator 570*a*, the angle calculating part 580, and the control part 590.

A second receiver may include a second reception antenna AR2, a second amplifier 540*b*, a second analog-digital converter 550*b*, a second IQ modulator 570*b*, a first phase correcting part 560*a*, the angle calculating part 580, and the control part 590.

The first phase correcting part 560*a* may include a first phase rotator 561*a* and a first phase comparator 563*a*. The first phase comparator 563*a* may compare the phases of the signals of the first and second receivers with each other and output the comparison result to the first phase rotator 561*a*.

When the phase of the signal of the first receiver is different from the phase of the signal of the second receiver as the comparison result, the first phase rotator 561*a* may rotate the phase of the signal of the second receiver such that the phases of the signals of the first and second receivers are matched with each other.

A third receiver may include a third reception antenna AR3, a third amplifier 540*c*, a third analog-digital converter 550*c*, a third IQ modulator 570*c*, a second phase correcting part 560*b*, the angle calculating part 580, and the control part 590.

The second phase correcting part 560*b* may include a second phase rotator 561*b* and a second phase comparator 563*b*. The second phase comparator 563*b* may compare the phases of the signals of the first and third receivers with each other and output the comparison result to the second phase rotator 561*b*.

When the phase of the signal of the first receiver is different from the phase of the signal of the third receiver as the comparison result, the second phase rotator 561*b* may rotate the phase of the signal of the third receiver such that the phases of the signals of the first and third receivers are matched with each other.

A fourth receiver may include a fourth reception antenna AR4, a fourth amplifier 540*d*, a fourth analog-digital converter 550*d*, a fourth IQ modulator 570*d*, a third phase correcting part 560*c*, the angle calculating part 580, and the control part 590.

The third phase correcting part 560*c* may include a third phase rotator 561*c* and a third phase comparator 563*c*. The third phase comparator 563*c* may compare the phases of the signals of the first and fourth receivers with each other and output the comparison result to the third phase rotator 561*c*.

When the phase of the signal of the first receiver is different from the phase of the signal of the third receiver as the comparison result, the second phase rotator 561*b* may rotate the phase of the signal of the third receiver such that the phases of the signals of the first and third receivers are matched with each other.

That is, the first to third phase correcting parts 560*a* to 560*c* may correct the phases of the second to fourth receivers to match the phases of the second to fourth receivers with the phase of the first receiver.

Figure 6:
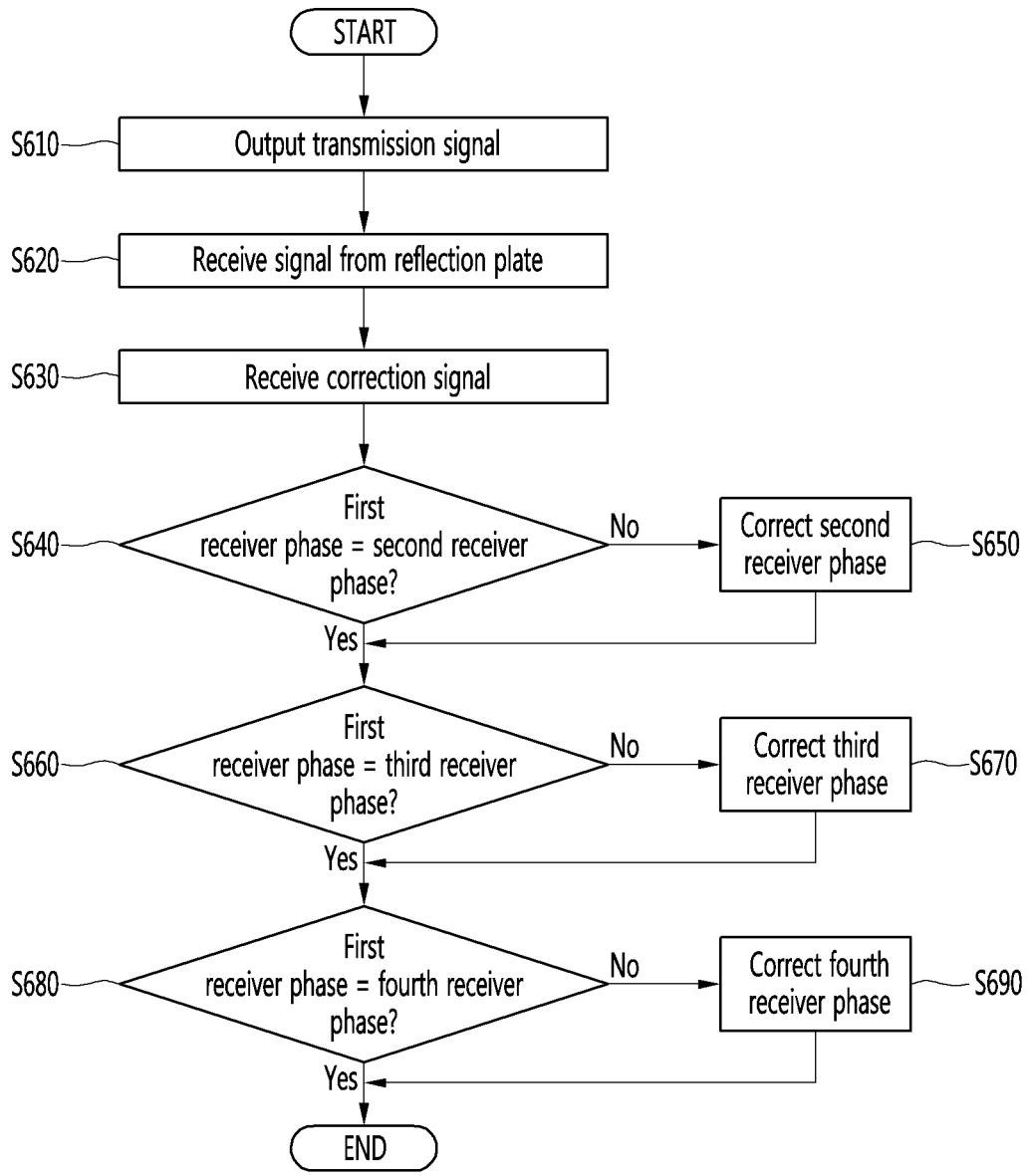
FIG. 6 is a flowchart illustrating an operation of correcting an error of a radar according to an embodiment of the present disclosure.

FIG. 6 is a flowchart illustrating an operation of correcting an error of a radar according to an embodiment of the present disclosure.

Referring to FIG. 6, in step S610, the transmitter of the self-calibration device 100 for a vehicle radar may output the transmission signal to the reflection plate. In step S620, the receiver of the self-calibration device 100 for a vehicle radar may receive the reflected signal by the reflection plate 200.

The first phase correcting part may receive the correction signal from the control part in step S630 and the first phase comparator may compare the phase of the first receiver with the phase of the second receiver in step S640. In step S650, when the phase of the signal of the first receiver is different from that of the signal of the second receiver, the first phase rotator may correct the phase of the signal of the second receiver such that the phase of the signal of the second receiver is matched with that of the signal of the first receiver.

In step S660, the second phase comparator may compare the phase of the first receiver with the phase of the third receiver. In step S670, when the phase of the signal of the first receiver is different from that of the signal of the third receiver, the second phase rotator may correct the phase of the signal of the third receiver such that the phase of the signal of the third receiver is matched with that of the signal of the first receiver.

In step S680, the third phase comparator may compare the phase of the first receiver with the phase of the fourth receiver. In step S690, when the phase of the signal of the first receiver is different from that of the signal of the fourth receiver, the third phase rotator may correct the phase of the signal of the fourth receiver such that the phase of the signal of the fourth receiver is matched with that of the signal of the first receiver.

Figure 7:
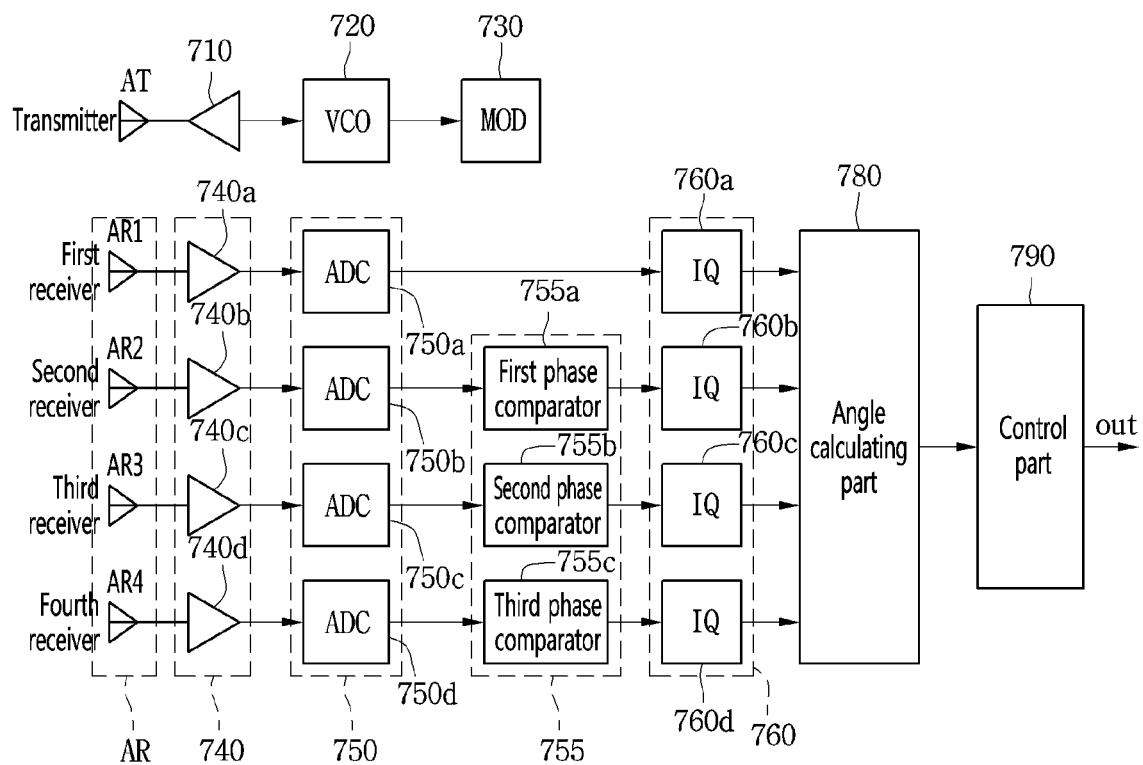
FIG. 7 is a block diagram illustrating a transmission part and a reception part of a radar according to another embodiment of the present disclosure.
Figure 8:
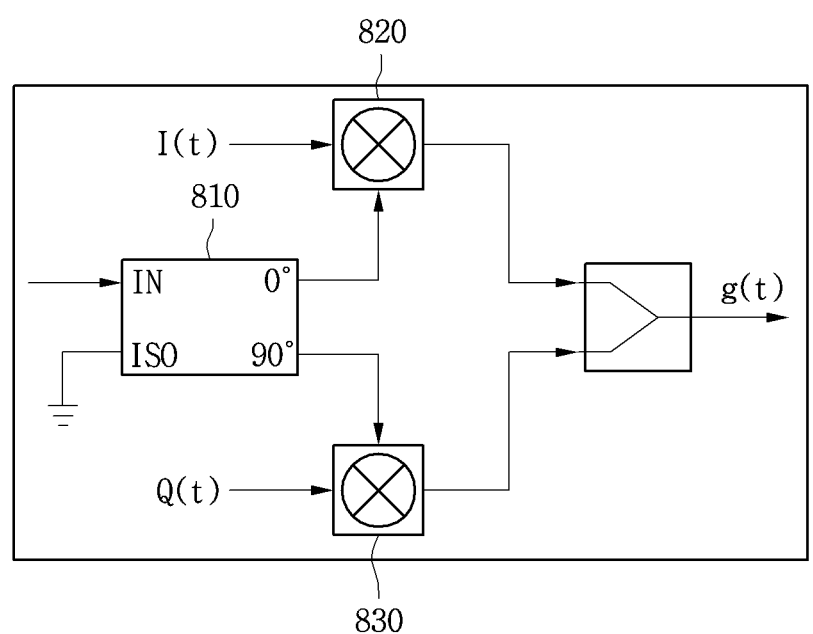
FIG. 8 is a block diagram illustrating an IQ modulator of a radar according to another embodiment of the present disclosure.

FIG. 7 is a block diagram illustrating a transmission part and a reception part of a radar according to another embodiment of the present disclosure. FIG. 8 is a block diagram illustrating an IQ modulator of a radar according to another embodiment of the present disclosure.

Referring to FIGS. 7 and 8, according to another embodiment of the present disclosure, the IQ modulating part 760 may correct the reception signal. The IQ modulating part 760 compares the phases of the reception signals with each other. When there is a different between the phases of the reception signals, the IQ modulating part 760 may adjust offset I (t) and Q (t) to correct the phase.

The first phase comparator 755*a* compares the phases of the signals of the first and second receivers with each other. When the phases of the signals of the first and second receivers are different from each other, the first IQ modulator 760*a* may adjust the offset I (t) and Q (t) to correct the phase.

The phase shifter 810 may adjust the phase of the input signal and output it to a first mixer 820 and a second mixer 830. The first mixer 820 may mix the input signal with I (t). For example, when the input signal is cos (Wct), the first mixer 820 may output I (t)*cos (Wct). The second mixer 830 may mix the orthogonal signal of the input signal with Q (t). When the input signal is cos (Wct), Q (t)*sin (Wct) may be output.

The output g (t) may be the sum of I (t) cos (Wct) and Q (t) sin (Wct) and adjust the phase by adjusting the offset I (t) and Q (t).

The second phase comparator 755b compares the phases of the signals of the first and third receivers with each other. When the phases of the signals of the first and third receivers are different from each other, the second IQ modulator 760b may adjust the offset I (t) and Q (t) to correct the phase.

The third phase comparator 755c compares the phases of the signals of the first and fourth receivers with each other. When the phases of the signals of the first and fourth receivers are different from each other, the third IQ modulator 760c may adjust the offset I (t) and Q (t) to correct the phase.

Figure 9:
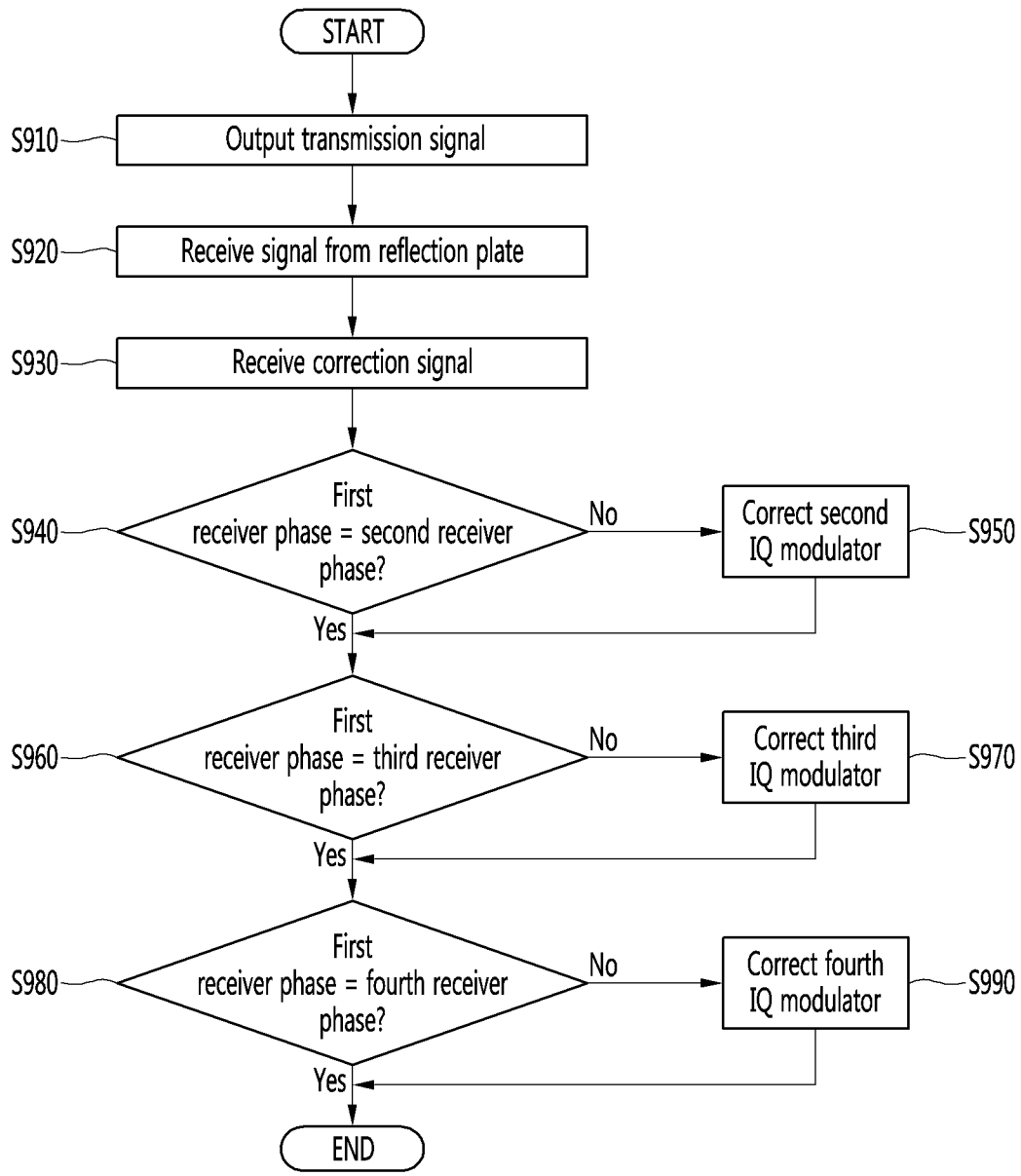
FIG. 9 is a flowchart illustrating an operation of correcting an error of a radar according to another embodiment of the present disclosure.

FIG. 9 is a flowchart illustrating an operation of correcting an error of a radar according to another embodiment of the present disclosure.

Referring to FIG. 9, in step S910, the transmitter of the self-calibration device 100 for a vehicle radar may output the transmission signal to the reflection plate. In step S920, the receiver of the self-calibration device 100 for a vehicle radar may receive the reflected signal by the reflection plate 200.

The first phase comparator 755a may receive the correction signal from the control part in step S930 and compare the phase of the reception signal of the first receiver with the phase of the reception signal of the second receiver in step S940. In step S950, when the phase of the reception signal of the first receiver is different from that of the reception signal of the second receiver, the second IQ modulator 760b may adjust the offset to correct the phase of the reception signal of the second receiver such that the phase of the reception signal of the second receiver is matched with that of the reception signal of the first receiver.

In step S960, the second phase comparator may compare the phase of the first receiver with the phase of the third receiver. In step S970, when the phase of the reception signal of the first receiver is different from that of the reception signal of the third receiver, the third IQ modulator 760c may correct the phase of the reception signal of the third receiver such that the phase of the reception signal of the third receiver is matched with that of the reception signal of the first receiver.

In step S980, the third phase comparator 755c may compare the phase of the reception signal of the first receiver with the phase of the reception signal of the fourth receiver. In step S990, when the phase of the reception signal of the first receiver is different from that of the reception signal of the fourth receiver, the fourth IQ modulator 760d may adjust the offset such that the phase of the reception signal of the fourth receiver is matched with that of the reception signal of the first receiver.

Figure 10:
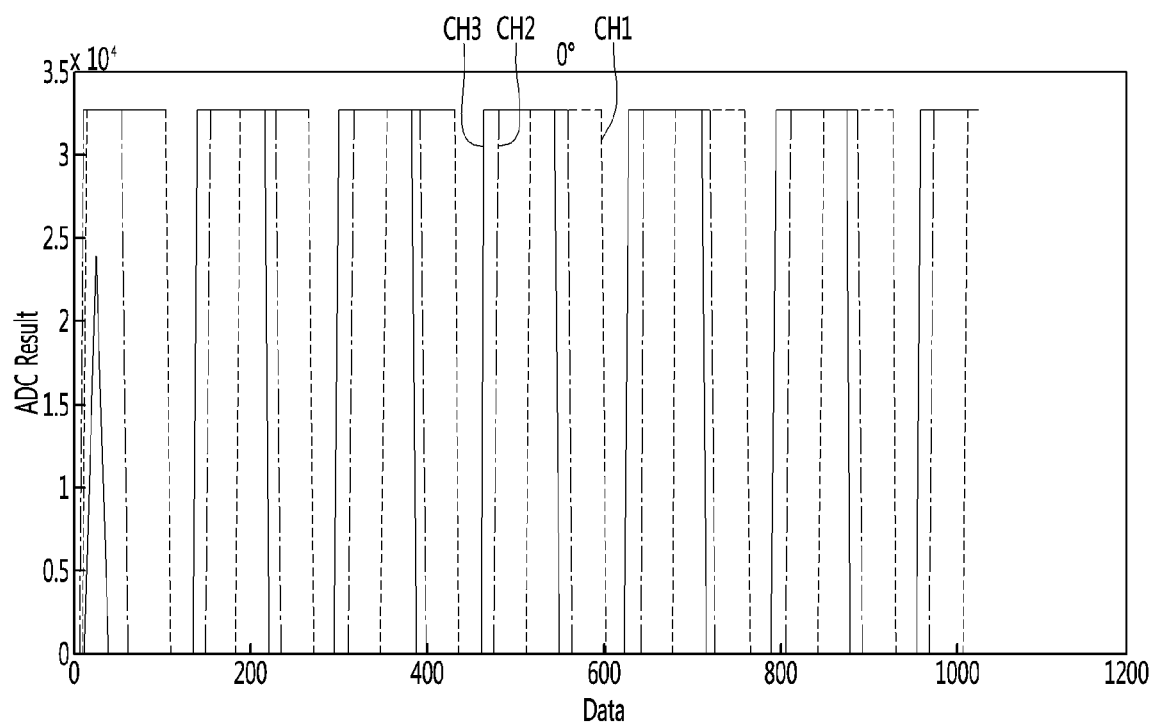
FIGS. 10 and 11 are graphs illustrating the result of correcting an error of a radar according to another embodiment of the present disclosure.
Figure 11:
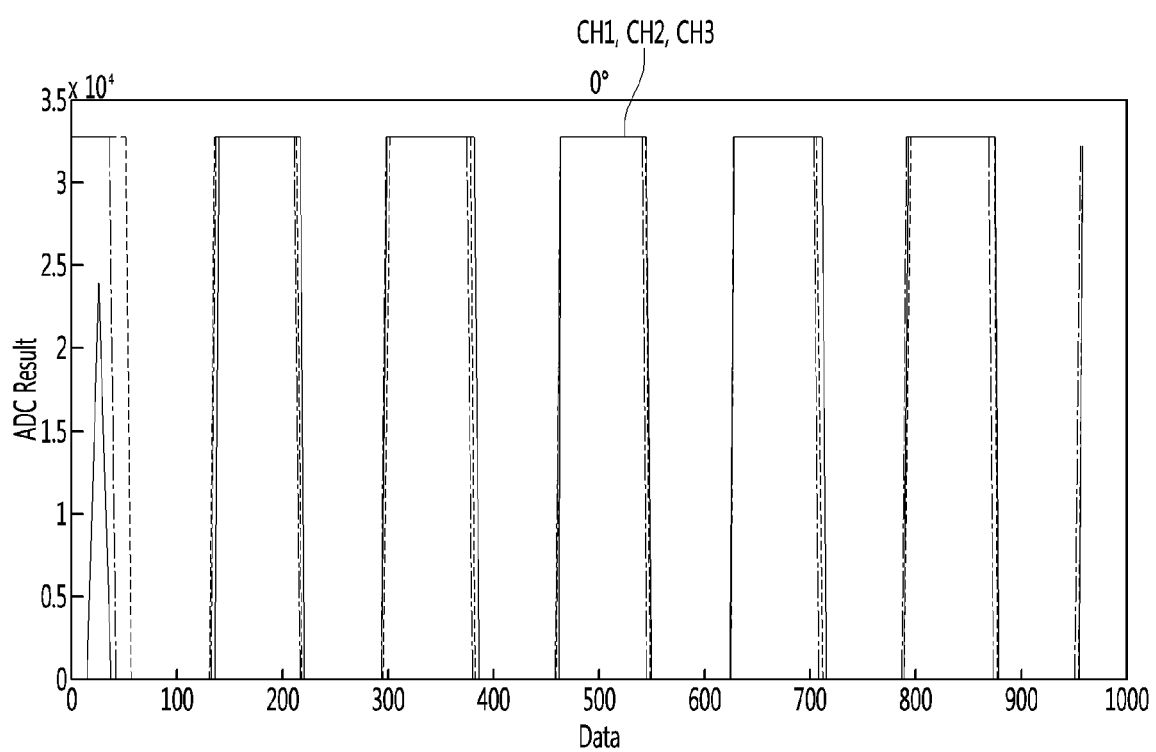

FIGS. 10 and 11 are graphs illustrating the result of correcting an error of a radar according to another embodiment of the present disclosure.

FIG. 10 is a graph showing an output g (t) of another embodiment shown in FIGS. 7 and 8, where the phase of the reception signal of the first receiver CH1, the phase of the reception signal of the second receiver CH2 and the phase of the reception signal of the third receiver CH3 are different from each other so that the output g (t) is output differently.

FIG. 11 shows a correction result obtained by adjusting the offset of the IQ modulator to be matched with the phase of the first receiver, where the phases of the reception signals are matched with that of the first receiver so that the output g (t) is output equally. That is, when an angle error of a radar occurs due to an external impact or the like, an error may be corrected by correcting the angles of other receivers to be matched with one another based on the first receiver.

Figure 12:
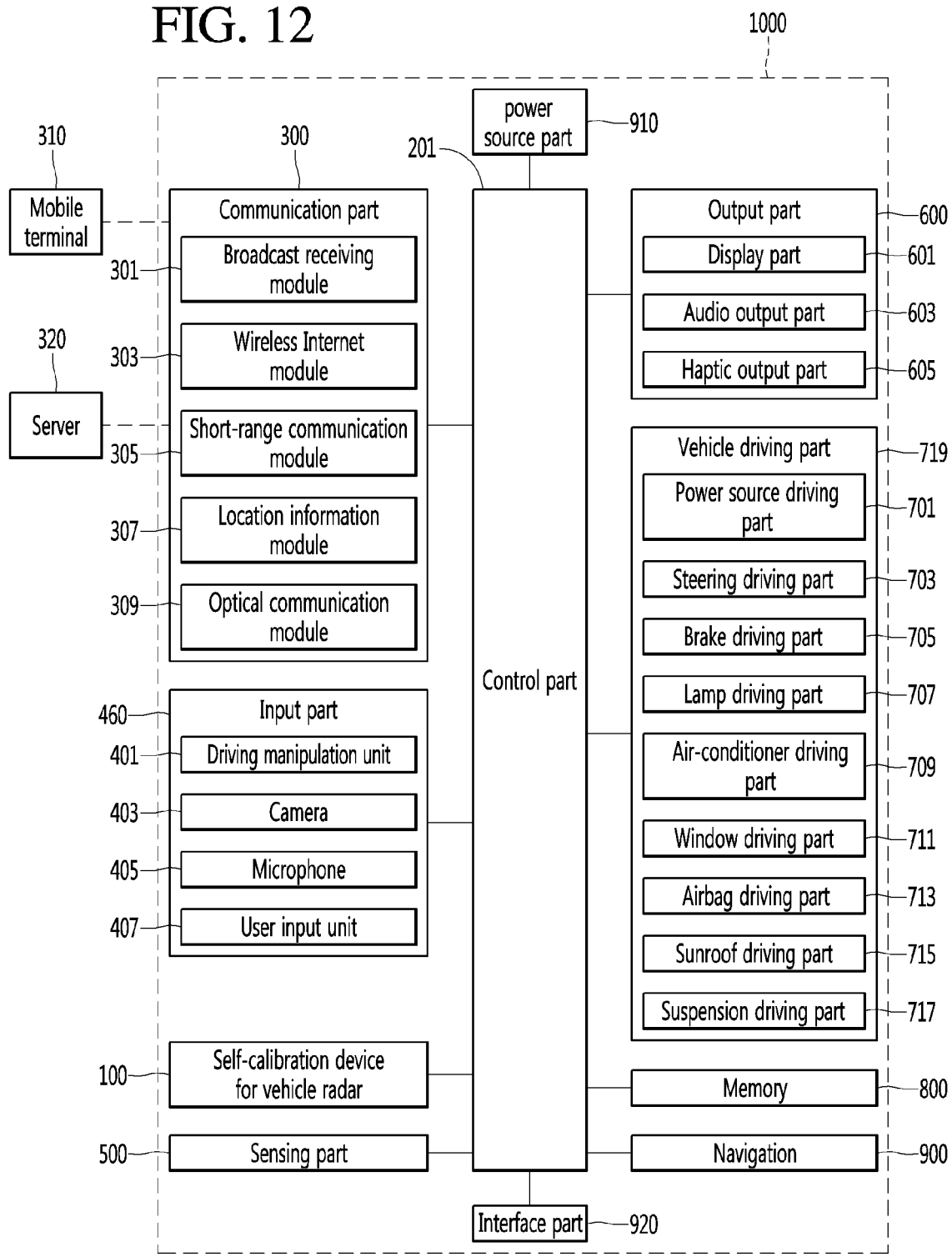
FIG. 12 is a block diagram illustrating n internal configuration of a self-calibration device for a vehicle radar according to an embodiment of the present disclosure.

FIG. 12 is a block diagram illustrating n internal configuration of a self-calibration device for a vehicle radar according to an embodiment of the present disclosure.

Referring to FIG. 12, the vehicle 1000 may include the self-calibration device 100 for a vehicle radar shown in FIG. 1, a control part 201, a communication part 300, an input part 460, a sensing part 500, an output part 600, a vehicle driving part 719, a memory 800, a navigation system 900, a power source part 910, and an interface part 920.

The control part 201 may control overall operations of each unit of the vehicle 1000. The control part 201 may be called an electronic control unit (ECU).

The communication part 300 may include one or more modules that enable wireless communication between the vehicle 1000 and the mobile terminal 310 or between the vehicle 1000 and a server 320. In addition, the communication part 300 may include one or more modules for connecting the vehicle 1000 to one or more networks.

The communication part 300 may include a broadcast receiving module 301, a wireless Internet module 303, a short-range communication module 305, a location information module 307, and an optical communication module 309.

The broadcast receiving module 301 receives a broadcast signal or broadcast related information from an external broadcast management server through a broadcast channel. In this case, the broadcast includes radio broadcast or TV broadcast.

The wireless Internet module 303 refers to a module for wireless Internet access, and may be built in or externally mounted in the vehicle 1000. The wireless Internet module 303 is configured to transmit and receive wireless signals in a communication network according to wireless Internet technologies.

The short-range communication module 305 may form a wireless local area network and perform short-range communication between the vehicle 1000 and at least one external device. For example, the short-range communication module 310 may wirelessly exchange data with a mobile terminal 310.

The location information module 307 is a module for acquiring information about a location of the vehicle 1000. There is a global positioning system (GPS) module as a representative example. For example, when the GPS module is utilized, the vehicle may acquire the location of the vehicle 100 using a signal transmitted from a GPS satellite.

The optical communication module 309 may include a light transmission part and a light reception part.

The input part 460 may include a driving manipulation unit 401, a camera 403, a microphone 405, and a user input part 407.

The driving manipulation part 401 receives a user input for driving the vehicle 1000. The driving manipulation part 401 may include a steering input unit, a shift input unit, an acceleration input unit, and a brake input unit.

The camera 403 may include an image sensor and an image processing module. The camera 403 may process a still image or a moving image obtained by the image sensor (e.g., a complementary metal oxide semiconductor (CMOS) or a charge-coupled device (CCD)). The image processing module may extract necessary information by processing the still or moving image obtained by the image sensor, and may transmit the extracted information to the control part 201. Meanwhile, the vehicle 1000 may include a camera 403 for photographing an ahead-vehicle image or an around-vehicle image.

The microphone 405 may process an external audio signal as electrical data. The processed data may be variously utilized based on a function currently performed by the vehicle 1000. The microphone 405 may convert a voice command of the user into electrical data. The converted electrical data may be transmitted to the control part 201.

The user input part 407 is used to receive information from the user. When information is input through the user input part 407, the control part 201 may control operation of the vehicle 1000 corresponding to the input information. The user input part 407 may include a touch input unit or a mechanical input unit. According to an embodiment, the user input part 407 may be disposed on a region of a steering wheel. In this case, the driver may manipulate the user input part 407 with fingers while gripping the steering wheel.

The sensing part 500 senses a signal related to the driving of the vehicle 1000, etc. To this end, the sensing part 500 may include a crash sensor, a wheel sensor, a speed sensor, a tilt sensor, a weight sensor, a heading sensor, a yaw sensor, a gyro sensor, a position module, a vehicle forward/reverse sensor, a battery sensor, a fuel sensor, a tire sensor, a steering sensor connected to a steering wheel rotation, a vehicle internal temperature sensor, a vehicle internal humidity sensor, an ultrasonic sensor, a radar, a rider, etc.

The output part 600, which outputs information processed by the control part 201, may include a display part 601, an audio output part 603, and a haptic output part 605.

The display part 601 may display the information processed by the control part 201. For example, the display part 601 may display vehicle related information. In this case, the vehicle related information may include vehicle control information for directly controlling the vehicle or driver assistance information for providing driving guide service to the vehicle driver. In addition, the vehicle related information may include vehicle state information indicating a current state of the vehicle, or vehicle driving information related to driving of the vehicle.

The display part 601 may include at least one of a liquid crystal display (LCD), a thin film transistor-liquid crystal display (TFT LCD), an organic light-emitting diode (OLED), a flexible display, a 3-dimensional (3D) display, and an electrophoretic ink (e-ink) display.

The display part 601 may be layered on or integrated with a touch sensor, and thus may implement a touchscreen. The touchscreen may serve as the user input part 407 for providing an input interface between the vehicle 1000 and the user and, at the same time, provide an output interface between the vehicle 1000 and the user. In this case, the display part 601 may include a touch sensor for sensing a touch on the display part 601, and thus may receive a control command input in a touch scheme. Thus, if the display part 601 is touched, the touch sensor may sense the touch and the control part 201 may generate a control command corresponding to the touch. An input using touch may be text, a number, or a menu item which can be indicated or specified in various modes Meanwhile, the display part 601 may include a cluster such that the driver may check the vehicle state information or the vehicle driving information while starting driving. The cluster may be provided on a dashboard. In this case, the driver may check the information displayed on the cluster while looking ahead.

Meanwhile, according to an embodiment, the display part 601 may be implemented with a head up display (HUD). When the display part 601 is implemented with a HUD, the display part 601 may output the information through a transparent display included in the windshield. Alternatively, the display part 601 may include a projection module and thus may output the information using an image projected onto the windshield.

The audio output part 603 converts an electrical signal from the controller 170 into an audio signal and outputs the audio signal. To this end, the audio output part 603 may include a speaker, etc. The audio output part 603 may also output sound corresponding to the operation of the user input part 407.

The haptic output part 605 generates a haptic output. For example, the haptic output part 605 may vibrate the steering wheel, a seat belt, or a seat to enable the user to recognize the output.

The vehicle driving part 719 may control operations of various apparatuses of the vehicle. The vehicle driving part 719 may include a power source driving part 701, a steering driving part 703, a brake driving part 705, a lamp driving part 707, an air-conditioner driving part 709, a window driving part 711, an airbag driving part 713, a sunroof driving part 715, and a suspension driving part 717.

The power source driving part 701 may electronically control a power source in the vehicle 1000.

The steering driving part 703 may electronically control a steering apparatus of the vehicle 1000. Thus, the travelling direction of the vehicle may be changed.

The brake driving part 705 may electronically control a brake apparatus (not shown) of the vehicle 1000. For example, the brake driving part 705 may control the operation of brakes provided to wheels to reduce the speed of the vehicle 1000. As another example, the operations of brakes provided to left and right wheels may be differently controlled such that the driving direction of the vehicle 1000 may be controlled to the left or right.

The lamp driving part 707 may control lamps provided inside or outside the vehicle to be turned on or off. In addition, the lamp driving part 707 may control the intensity and direction of light of the lamps. For example, the lamp driving part 707 may control turn signal lamps and brake lamps.

The air-conditioner driving part 709 may electronically control an air-conditioner (not shown) of the vehicle 1000. For example, when the temperature inside the vehicle is high, the air-conditioner may be controlled such that the air-conditioner is operated to supply cool air to the inside of the vehicle.

The window driving part 711 may electronically control a window apparatus in the vehicle 1000. For example, the window driving part 711 may control left and right windows of the vehicle to be opened or closed.

The airbag driving part 713 may electronically control an airbag apparatus of the vehicle 1000. For example, the airbag driving part 713 may control an airbag to inflate in danger.

The sunroof driving part 715 may electronically control a sunroof apparatus (not shown) of the vehicle 1000. For example, the sunroof driving part 715 may control the sunroof to be opened or closed.

The suspension driving part 715 may electronically control a suspension apparatus (not shown) of the vehicle 1000. For example, when the road is bumpy, the suspension driving part 715 may control the suspension apparatus to reduce the vibration of the vehicle 1000.

The memory 800 may store various data for overall operation of the vehicle 201 such as programs for process or control of the control part 201.

The navigation system 900 may transmit and receive set destination information, route information according to the destination, map information or the vehicle position information to/from the control part 201.

The power source part 910 may supply power necessary for operation of each component under control of the control part 201. Particularly, the power source part 910 may receive power supplied from a battery (not shown) of the vehicle, etc.

The interface part 920 may serve as a path to/from various types of external devices connected to the vehicle 1000. For example, the interface part 920 may include a port connectable to the mobile terminal 310, and may be connected through the port to the mobile terminal 310. In this case, the interface part 920 may exchange data with the mobile terminal 310.

Figure 13:
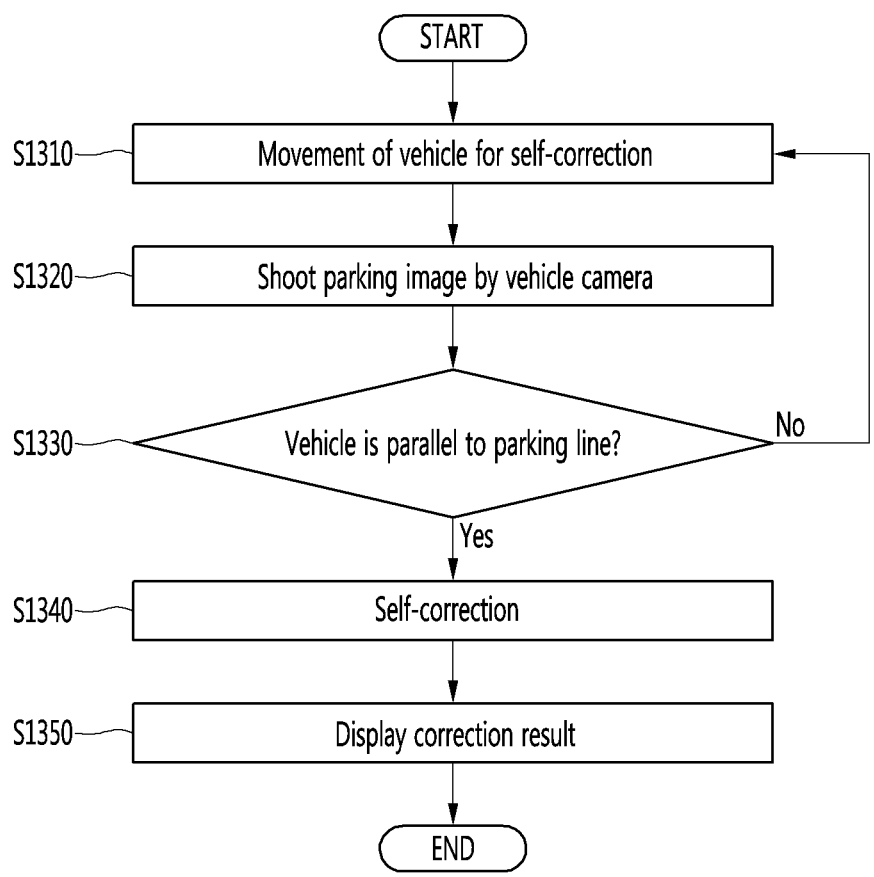
FIG. 13 is a flowchart illustrating an operation of correcting an error of a radar according to an embodiment of the present disclosure.

FIG. 13 is a flowchart illustrating an operation of correcting an error of a radar according to an embodiment of the present disclosure.

Referring to FIG. 13, in step S1310, the vehicle 1000 may move along the parking line for the self-correction of the radar mounted thereon. In this case, in step S1320, the camera 403 may shoot an image to determine whether the vehicle 1000 and the parking lines 210 and 220 are parallel.

In step S1330, the control part 201 may analyze the image shot by the camera 403, and may determine whether the vehicle 1000 is parallel to the parking lines.

Then, in step S1340, the operation of correcting an error of the radar may be performed, and in step S1350, when the correction is completed, the correction result may be displayed on the display part 601.

Figure 14:
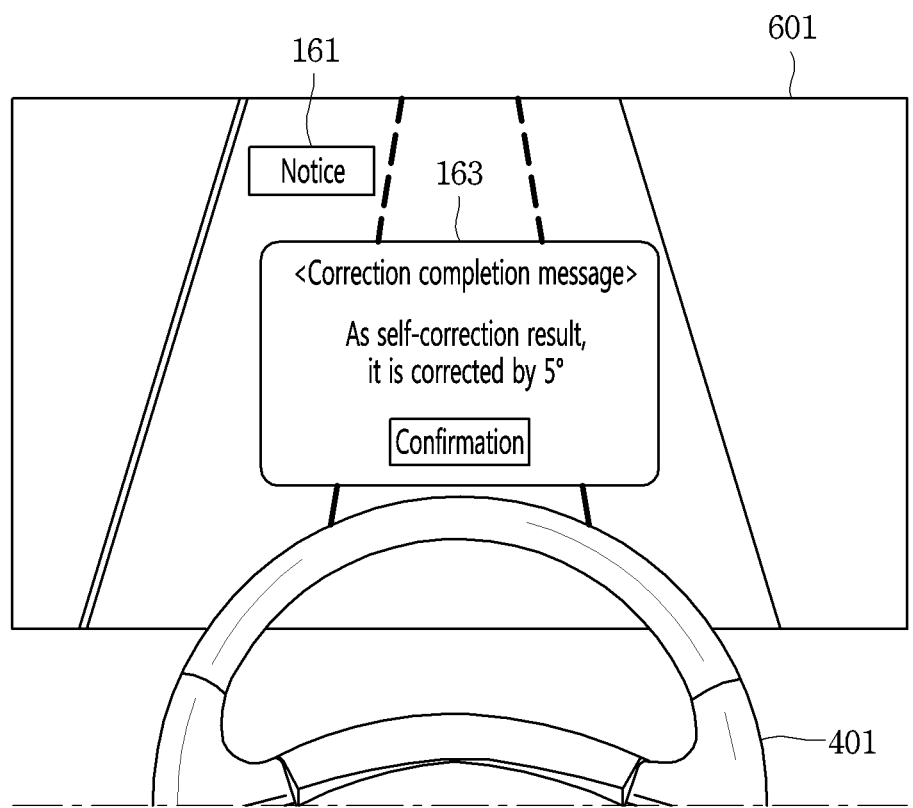
FIG. 14 is a flowchart illustrating an operation of adjusting a position of a radar according to another embodiment of the present disclosure.

FIG. 14 is a flowchart illustrating an operation of adjusting a position of a radar according to another embodiment of the present disclosure.

Referring to FIG. 14, the display part 601 may display the image related to the correction operation of the self-calibration device for a vehicle radar. To display an image, the display part 601 may include the cluster or the HUD in the front of the inside of the vehicle. Meanwhile, the HUD may be disposed in the front glass window of the vehicle and may include a transparent film or a reflective lens. The HUD may provide information to the driver by projecting the correction result of the self-calibration device for a vehicle radar on the transparent film or reflective lens. The correction result may be displayed on the message window 161 and 163 to be provided to the driver and is not limited to the contents displayed on the message window.

Figure 15:
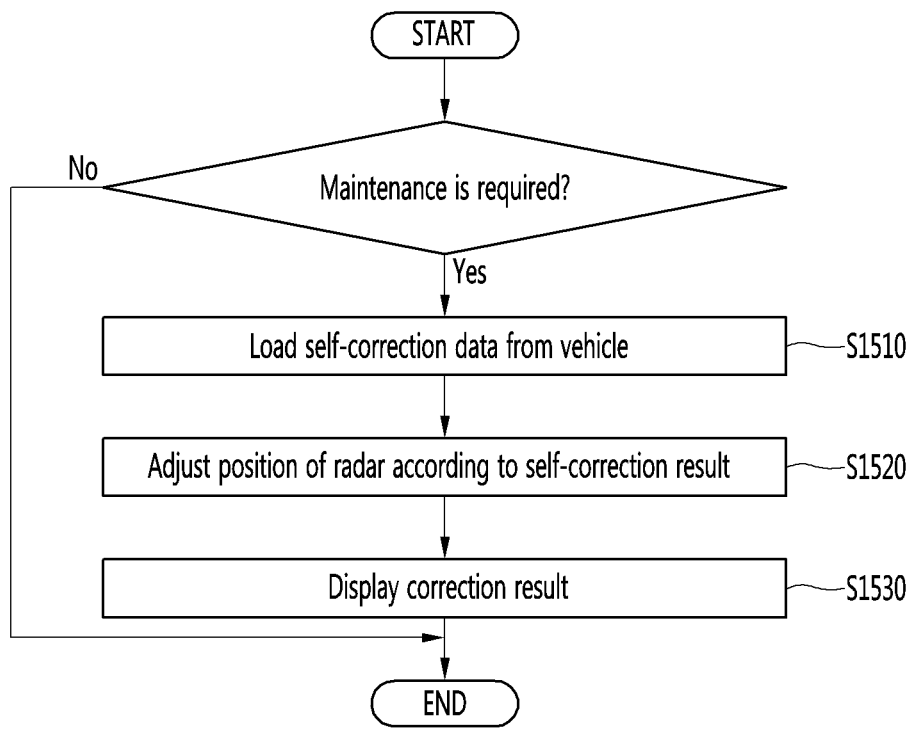
FIG. 15 is a flowchart illustrating an operation of adjusting a position of a radar according to another embodiment of the present disclosure.

FIG. 15 is a flowchart illustrating an operation of adjusting a position of a radar according to another embodiment of the present disclosure.

Referring to FIG. 15, the self-calibration device 100 for a vehicle radar may store the correction result in the memory 800 and the control part 201 may inquire, through the display part 601, whether maintenance is required when the radar correction history is searched. In step S1510, when the requirement of the maintenance is input by the driver, the correction result may be loaded from the vehicle 1000 and provided to a vehicle repair shop. In step S1520, the vehicle repair shop may adjust the mounting position of the self-calibration device 100 for a vehicle radar according to the correction result received from the vehicle 1000. Thereafter, in step S1530, the correction result may be displayed on the display part 601 to be provided to the driver.

Figure 16:
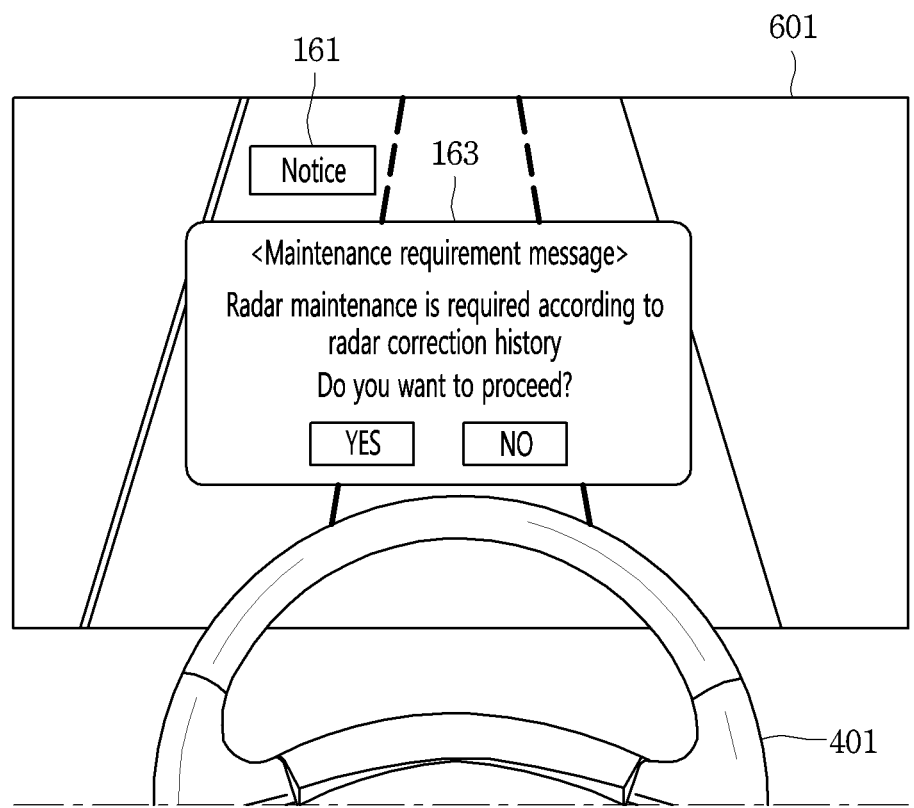
FIG. 16 is a view illustrating an operation of displaying radar maintenance according to an embodiment of the present disclosure.

FIG. 16 is a view illustrating an operation of displaying radar maintenance according to an embodiment of the present disclosure.

Referring to FIG. 16, when the correction history of the self-calibration device 100 for a vehicle radar is searched, the control part 201 may display whether maintenance is required. Whether maintenance is required may be displayed on the message window 161 and 163 to be provided to the driver, and the driver may input the maintenance requirement through the user input part 407.

INDUSTRIAL APPLICABILITY

The self-calibration device and the self-calibration method for a vehicle radar according to embodiments of the present disclosure may be used in the field of radar systems.

The invention claimed is:

1. A self-calibration device for a vehicle radar installed at a front of a vehicle, the self-calibration device comprising:
a transmission part to output a transmission signal to a reflection plate disposed at the front of the vehicle; and
a reception part to receive a reception signal reflected by the reflection plate, the reception part comprising:
a first receiver to receive a first reception signal; a second receiver to receive a second reception signal; a first phase comparator to compare a phase of the first reception signal with a phase of the second reception signal;
a first phase correction part to correct the phase of the second reception signal based on a tilting angle of the second receiver by confirming the tilting angle of the second receiver from a comparison result of the first phase comparator and to correct the phase of the second reception signal such that the second reception signal has the phase equal to the first reception signal;
an angle calculation part to set the corrected phase as a reference value; and
a control part to analyze a parking image photographed by a vehicle camera and to determine whether the vehicle is parked parallel to a parking line, wherein the first phase correction part corrects the phase of the second reception signal based on the parking image photographed by the vehicle camera and the determining whether the vehicle is parked parallel to the parking line by analyzing the parking image.

2. The self-calibration device of claim 1, wherein the first phase correction part comprises a phase rotator to rotate the phase of the second reception signal such that the second reception signal has the phase equal to the phase of the first reception signal when the phase of the second reception signal is different from the phase of the first reception signal.

3. The self-calibration device of claim 2, wherein the reception part further comprises:
a third receiver to receive a third reception signal;
a second phase comparator to compare the phase of the first reception signal with a phase of the third reception signal; and
a second phase correction part to correct the phase of the third reception signal based on a tilting angle of the third receiver by confirming the tilting angle of the third receiver from a comparison result of the second phase comparator.

4. The self-calibration device of claim 3, wherein the reception part further comprises:
a fourth receiver to receive a fourth reception signal;
a third phase comparator to compare the phase of the first reception signal with a phase of the fourth reception signal; and
a third phase correction part to correct the phase of the fourth reception signal based on a tilting angle of the fourth receiver by confirming the tilting angle of the fourth receiver from a comparison result of the third phase comparator.

5. The self-calibration device of claim 1, wherein the reference value is set to angle θ (zero).

6. The self-calibration device of claim 1, wherein the first phase correction part comprises an IQ modulation part to correct the phase of the second reception signal by controlling an offset according to the comparison result.

7. A self-calibration method for a vehicle radar, the self-calibration method comprising:
   outputting a signal toward a reflection plate by a radar installed at a front of a vehicle;
   reflecting the signal by the reflection plate;
   comparing a phase of a first reception signal received in a first receiver of the radar with a phase of a second reception signal received in a second receiver of the radar;
   determining that the second receiver is tilted when the phase of the first reception signal is different from the phase of the second reception signal;
   correcting the phase of the second reception signal such that the second reception signal has the phase equal to the phase of the first reception signal when it is determined that the second receiver is tilted;
   photographing a parking image by a vehicle camera;
   determining whether the vehicle is parked parallel to a parking line by analyzing the parking image; and
   correcting the phase of the second reception signal based on the parking image photographed by the vehicle camera and the determining whether the vehicle is parked parallel to the parking line by the analyzing the parking image.

8. The self-calibration method of claim 7, wherein the correcting of the phase comprises rotating the phase of the second reception signal such that the second reception signal has the phase equal to the phase of the first reception signal.

9. The self-calibration method of claim 7, wherein the correcting of the phase comprises controlling an offset of an IQ modulation part applied to the second receiver such that the second reception signal has the phase equal to the phase of the first reception signal.

10. The self-calibration method of claim 7, further comprising:
    comparing the phase of the first reception signal received in the first receiver of the radar with a phase of a third reception signal received in a third receiver of the radar;
    determining that the third receiver is tilted when the phase of the first reception signal is different from the phase of the third reception signal; and
    correcting the phase of the third reception signal such that the third reception signal has the phase equal to the phase of the first reception signal when it is determined that the third receiver is tilted.

11. The self-calibration method of claim 10, further comprising:
    comparing the phase of the first reception signal received in the first receiver of the radar with a phase of a fourth reception signal received in a fourth receiver of the radar;
    determining that the fourth receiver is tilted when the phase of the first reception signal is different from the phase of the fourth reception signal; and
    correcting the phase of the fourth reception signal such that the fourth reception signal has the phase equal to the phase of the first reception signal when it is determined that the fourth receiver is tilted.

12. The self-calibration method of claim 7, further comprising displaying a correction result.

* * * * *